(12) United States Patent
Faruque et al.

(10) Patent No.: US 9,744,932 B1
(45) Date of Patent: Aug. 29, 2017

(54) UPWARDLY INFLATABLE VEHICLE AIRBAG

(71) Applicant: Ford Global Technologies, LLC, Dearborn, MI (US)

(72) Inventors: Mohammed Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/085,137

(22) Filed: Mar. 30, 2016

(51) Int. Cl.
*B60R 21/16* (2006.01)
*B60R 21/20* (2011.01)
*B60R 21/231* (2011.01)

(52) U.S. Cl.
CPC .............. *B60R 21/16* (2013.01); *B60R 21/20* (2013.01); *B60R 21/231* (2013.01); *B60R 2021/161* (2013.01)

(58) Field of Classification Search
CPC ....... B60R 21/16; B60R 21/231; B60R 21/20; B60R 2021/161
See application file for complete search history.

(56) References Cited

U.S. PATENT DOCUMENTS

| | | | |
|---|---|---|---|
| 3,510,150 A | 5/1970 | Wilfert | |
| 3,618,979 A | 11/1971 | Gulette | |
| 3,623,768 A * | 11/1971 | Capener | B60R 21/207 280/730.2 |
| 3,795,412 A | 3/1974 | John | |
| 3,897,961 A | 8/1975 | Leising et al. | |
| 3,953,049 A * | 4/1976 | Surace | B60R 21/08 280/730.1 |
| 4,227,717 A * | 10/1980 | Bouvier | B60R 21/16 280/730.2 |
| 4,508,294 A * | 4/1985 | Lorch | B64D 25/02 244/122 AG |
| 5,470,103 A | 11/1995 | Vaillancourt et al. | |
| 5,568,902 A * | 10/1996 | Hurley, Jr. | B64D 1/14 244/138 R |

(Continued)

FOREIGN PATENT DOCUMENTS

DE 2008030380 A1 1/2009
FR 2667831 10/1990

(Continued)

OTHER PUBLICATIONS

Notice of Allowance dated Apr. 27, 2017; U.S. Appl. No. 15/074,465; 21 pages.

*Primary Examiner* — Darlene P Condra
(74) *Attorney, Agent, or Firm* — Frank MacKenzie; Bejin Bieneman PLC

(57) ABSTRACT

A vehicle interior includes a floor, an airbag supported by the floor and being inflatable away from the floor to an inflated position. The airbag includes an outer panel, an inner panel, and an inflation chamber defined between the inner panel and the outer panel. In the inflated position, the outer panel and the inner panel extend along a curved path about an axis transverse to the floor. During a vehicle impact, the airbag may be inflated to the inflated position to absorb energy from an occupant of the vehicle.

21 Claims, 11 Drawing Sheets

(56) References Cited

U.S. PATENT DOCUMENTS

| | | | |
|---|---|---|---|
| 5,575,497 A * | 11/1996 | Suyama | B60R 21/231 |
| | | | 280/730.1 |
| 6,142,521 A * | 11/2000 | Shephard | B60R 19/00 |
| | | | 280/728.1 |
| 6,513,829 B1 | 2/2003 | Zumpano | |
| 7,331,600 B2 * | 2/2008 | Miyata | B62J 27/00 |
| | | | 280/730.1 |
| 7,523,956 B2 | 4/2009 | Zumpano | |
| 8,087,690 B2 | 1/2012 | Kim | |
| 8,882,138 B1 * | 11/2014 | Hicken | B60R 21/231 |
| | | | 280/730.1 |
| 9,272,680 B1 * | 3/2016 | Mirzazadeh | B60R 21/207 |
| 9,321,423 B2 * | 4/2016 | Jaradi | B60R 21/015 |
| 9,446,731 B1 * | 9/2016 | West | B60R 13/0262 |
| 9,533,651 B1 | 1/2017 | Ohno | |
| 2004/0160039 A1 | 8/2004 | Heist et al. | |
| 2006/0192367 A1 | 8/2006 | Zumpano et al. | |
| 2013/0015642 A1 | 1/2013 | Islam et al. | |
| 2013/0087995 A1 | 4/2013 | Lee et al. | |
| 2014/0217796 A1 * | 8/2014 | Haller | B60N 2/508 |
| | | | 297/344.26 |
| 2015/0167233 A1 * | 6/2015 | Hwang | D06N 7/0092 |
| | | | 428/196 |
| 2015/0258954 A1 | 9/2015 | Engelman et al. | |
| 2015/0274114 A1 * | 10/2015 | Nagasawa | B60R 21/231 |
| | | | 280/730.1 |
| 2016/0052636 A1 * | 2/2016 | Moeller | B64D 25/02 |
| | | | 244/121 |
| 2016/0121839 A1 | 5/2016 | Ko et al. | |
| 2016/0264021 A1 | 9/2016 | Gillett | |

FOREIGN PATENT DOCUMENTS

| | | |
|---|---|---|
| FR | 2724350 | 9/1994 |
| KR | 100993032 | 11/2010 |

* cited by examiner

FIG. 2

UPWARDLY INFLATABLE VEHICLE AIRBAG

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities. There remains an opportunity to design vehicle amenities for the occupants that takes into account the reduced operation monitoring provided by the autonomous vehicle.

BRIEF DESCRIPTION OF THE DRAWINGS

FIG. 2 is the perspective view of FIG. 1 with the airbags in an inflated position.

DETAILED DESCRIPTION

Figure 1:
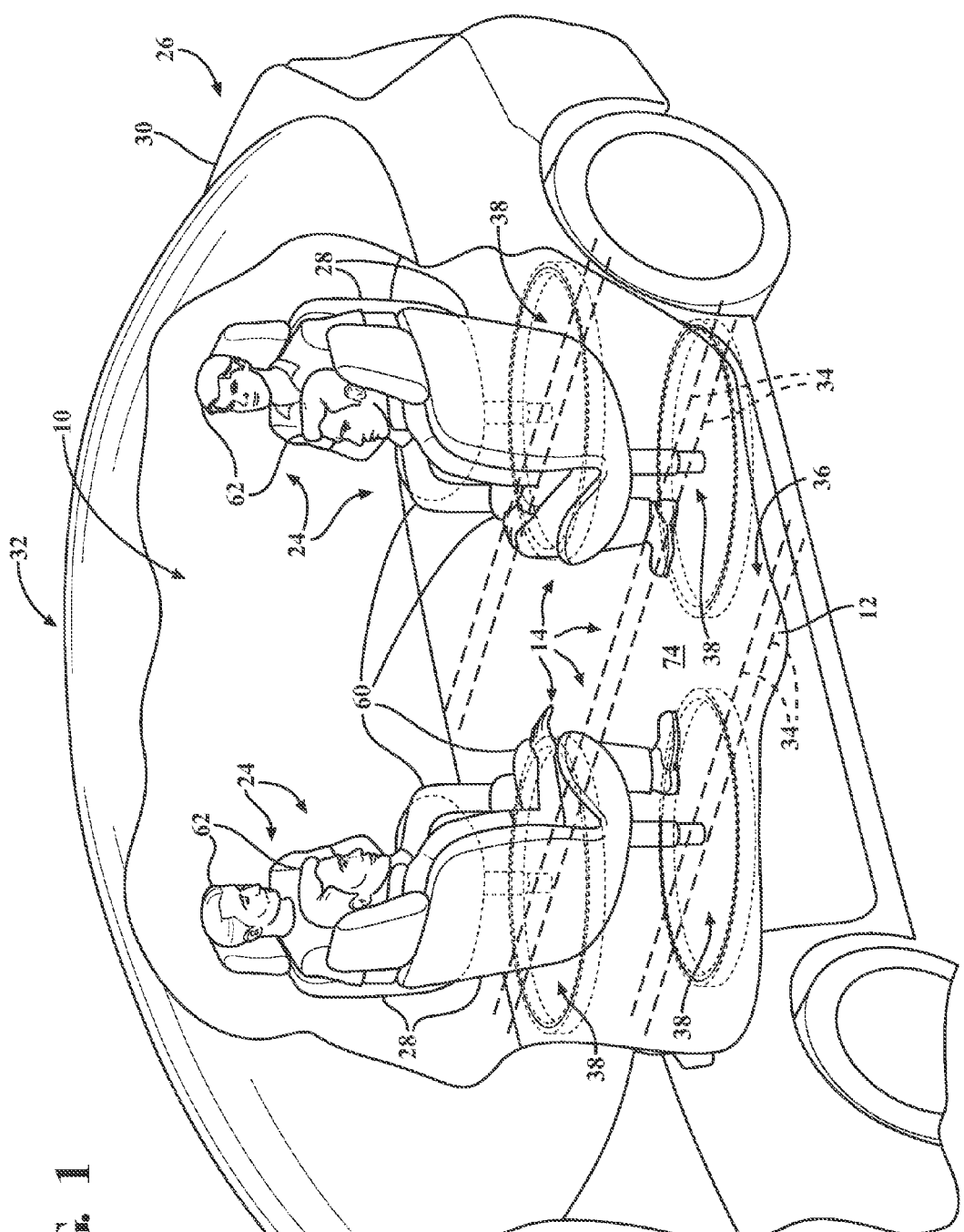
FIG. 1 is a perspective view of a vehicle including airbags in an uninflated position supported by a floor.

With reference to the Figures, wherein like numerals indicate like parts throughout the several views, an interior 10 of a vehicle 26 includes a floor 12, and an airbag 14 supported by the floor 12 and being inflatable away from the floor 12 to an inflated position. The airbag 14 includes an outer panel 16, an inner panel 18, and an inflation chamber 20 (numbered in FIGS. 6 and 8) defined between the inner panel 18 and the outer panel 16. In the inflated position, the outer panel 16 and the inner panel 18 extend along a curved path about an axis A transverse to the floor 12.

Figure 2:
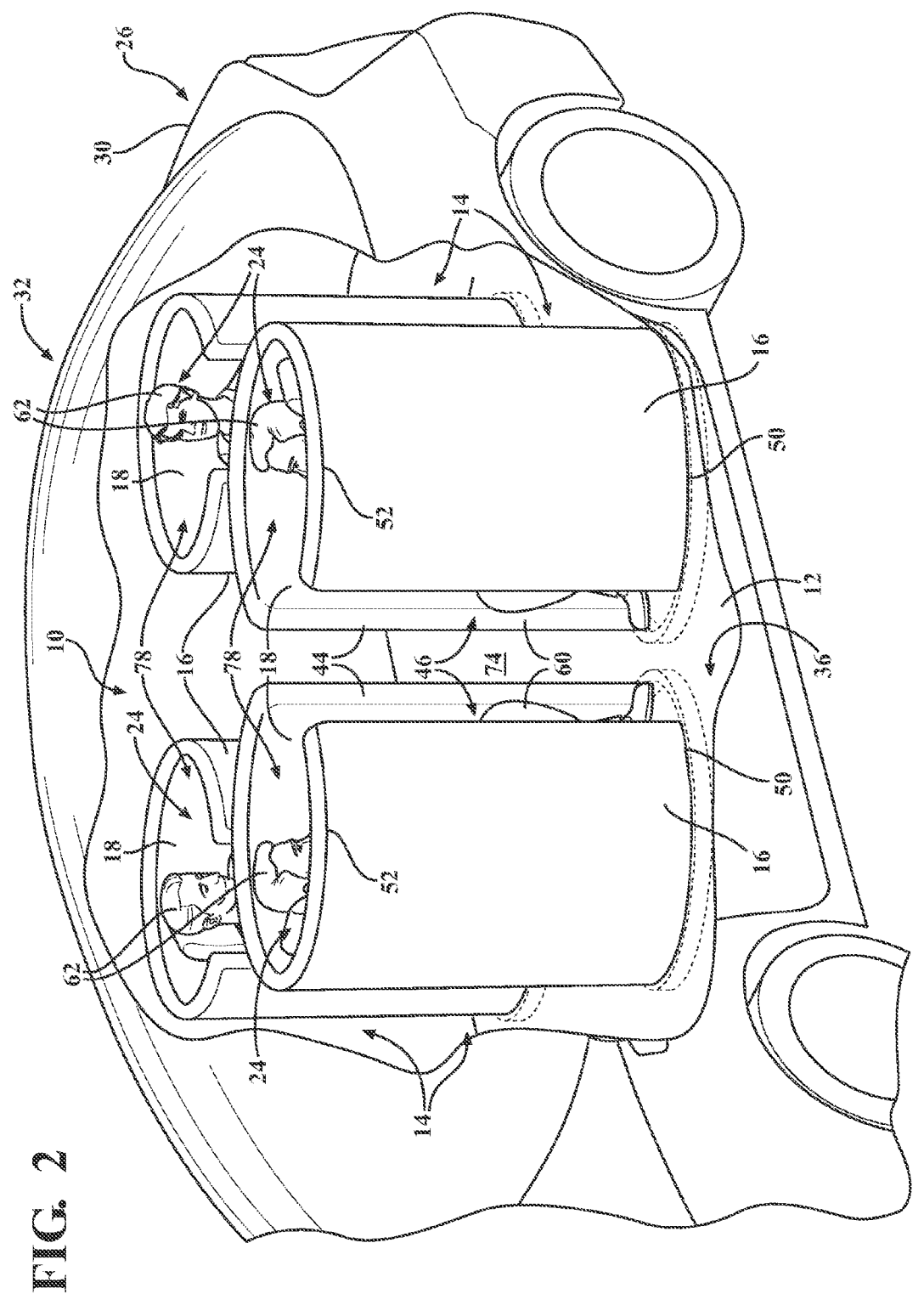

As set forth further below, the airbag 14 may inflate from an uninflated position, as shown in FIG. 1, to the inflated position, as shown in FIG. 2. This inflation may occur in response to a vehicle impact. The airbag 14 in the inflated position may absorb energy during the vehicle impact from an occupant 24, and thereby the airbag 14 in the inflated position may reduce a likelihood of the occupant 24 impacting other occupants 24 and/or components of the vehicle interior 10. Specifically, as set forth below, the vehicle 26 may include a plurality of airbags 14, and in such a configuration, the airbags 14 may absorb energy from the occupants 24 when the occupants impact the respective airbag 14, and the airbags may impact each other and hold each other upright to restrict movement of the occupants.

The vehicle 26, for example, may be an autonomous vehicle. In other words, the vehicle 26 may be autonomously operated such that the vehicle 26 may be driven without constant attention from a driver (not shown), i.e., the vehicle 26 may be self-driving without human input. During the operation of the autonomous vehicle the occupants 24 may face one another. The airbag 14 in the inflated position may reduce the likelihood of the occupants 24 impacting one another. For example, the airbag 14 may restrain movement of the occupants 24 toward each other when seats 28 are rotated in any position relative to each other.

As shown in FIG. 1, the vehicle 26 includes a vehicle body 30 defining the vehicle interior 10. The vehicle body 30 may include a roof 32, the floor 12, and a plurality of pillars (not numbered). The vehicle body 30 may have a uni-body construction, a body-on-frame construction, or any other suitable construction.

The floor 12 may include a plurality of cross-beams 34 and a floor panel 36 supported on the cross-beams 34. The floor 12 may include upholstery 74, e.g., carpeting, trim, etc., supported on the floor panel 36.

The vehicle interior 10 may include one or more seats 28. For example as shown in Figures, the vehicle interior 10 may include multiple seats 28 supported by the floor 12. The vehicle 26 may include any suitable number of seats 28, and the seats 28 may be arranged in any suitable arrangement. For example, as shown in the Figures, the seats 28 may be arranged in a ring pattern. As another example, the seats 28 may be arranged in any suitable number of rows. The seat 28 may be, for example, a bucket seat, a bench seat, a child seat, a booster seat, or any other suitable type of seat. The seats 28 may be mounted in a fixed position to the floor 12 as shown in FIG. 1, e.g., fixed to the cross-beams 34. Alternatively, the seats 28 may be moveable relative to the floor 12 of the vehicle 26, e.g., in a vehicle 26 fore-and-aft direction and/or a cross-vehicle direction. The seats 28 may be rotatable about an axis transverse to the floor 12, e.g., axis A.

The vehicle interior 10 may include a base 38 supporting the seat 28 on the floor 12. The base 38 may support the airbag 14 and/or an inflator 40. The base 38 may rotate relative to the floor 12, e.g., may be rotatably engaged with the cross-beams 34 and/or the floor panel 36. Alternatively, the base 38 may be fixed relative to the floor 12, in which case, the seat 28 may be rotatable relative to the base 38. The base 38 may be, for example, round in shape.

Figure 4:
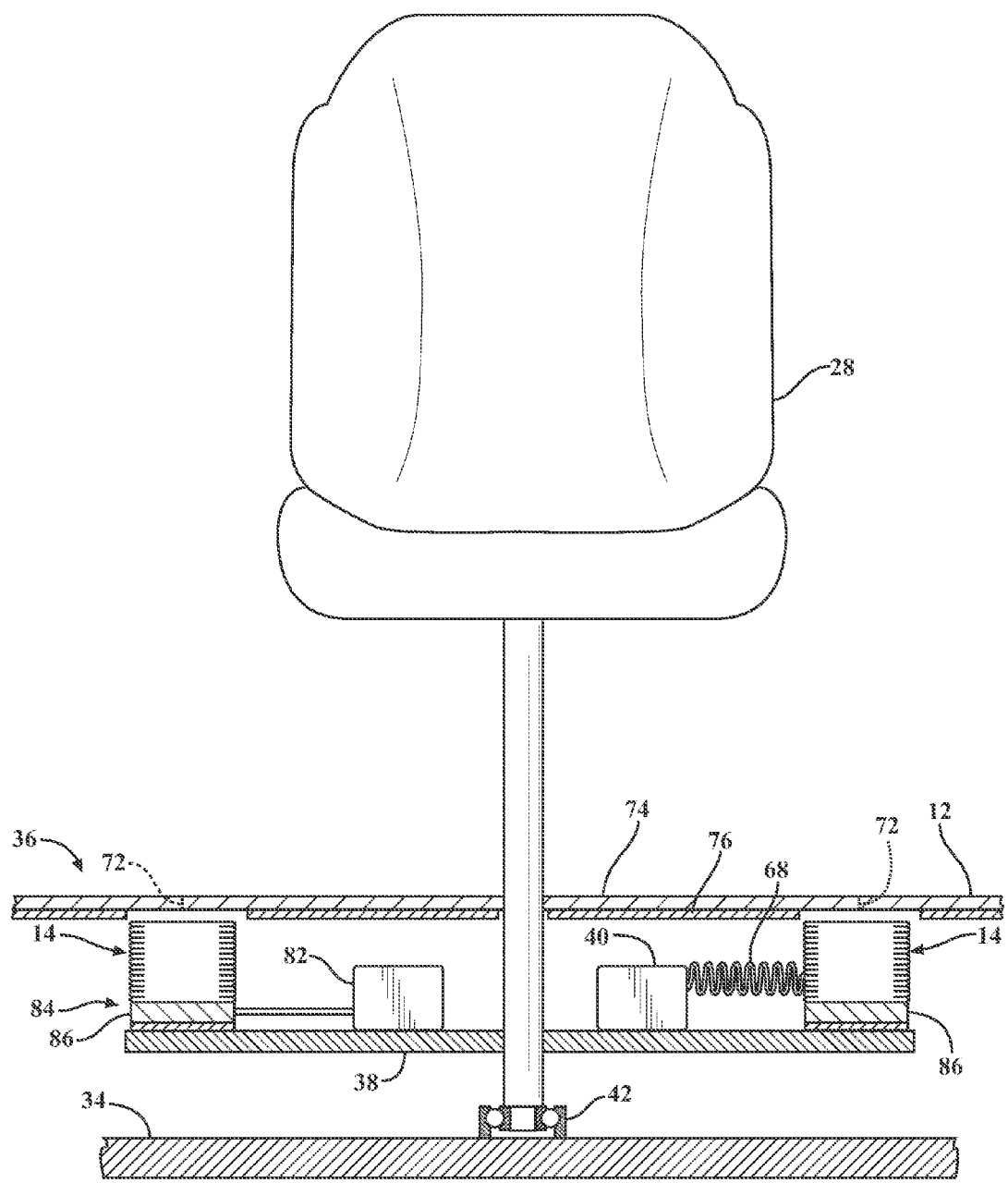
FIG. 4 is a cross-sectional view of a seat rotatably supported relative to the floor and including the airbag in the uninflated position.
Figure 5:
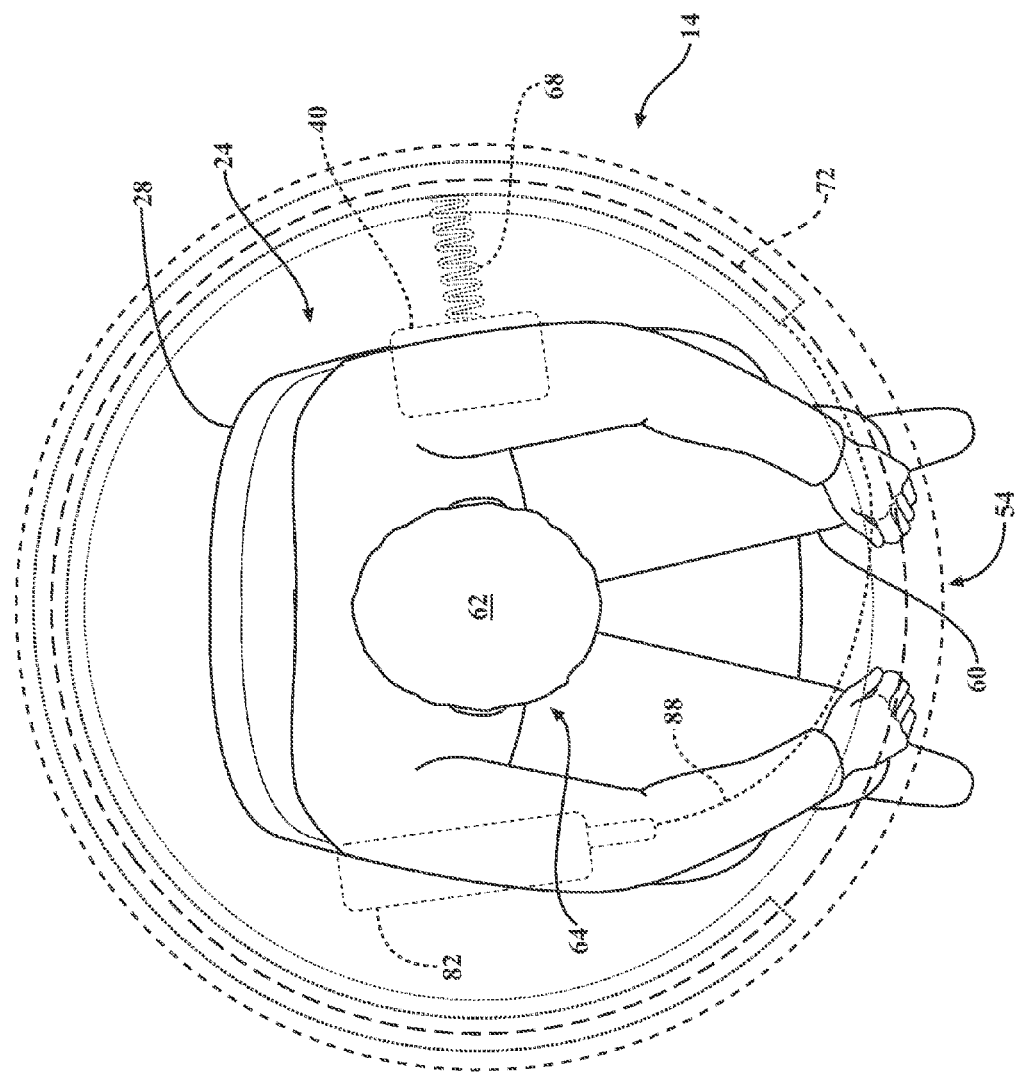
FIG. 5 is a top view of the seat with the airbag shown in hidden lines.
Figure 6:
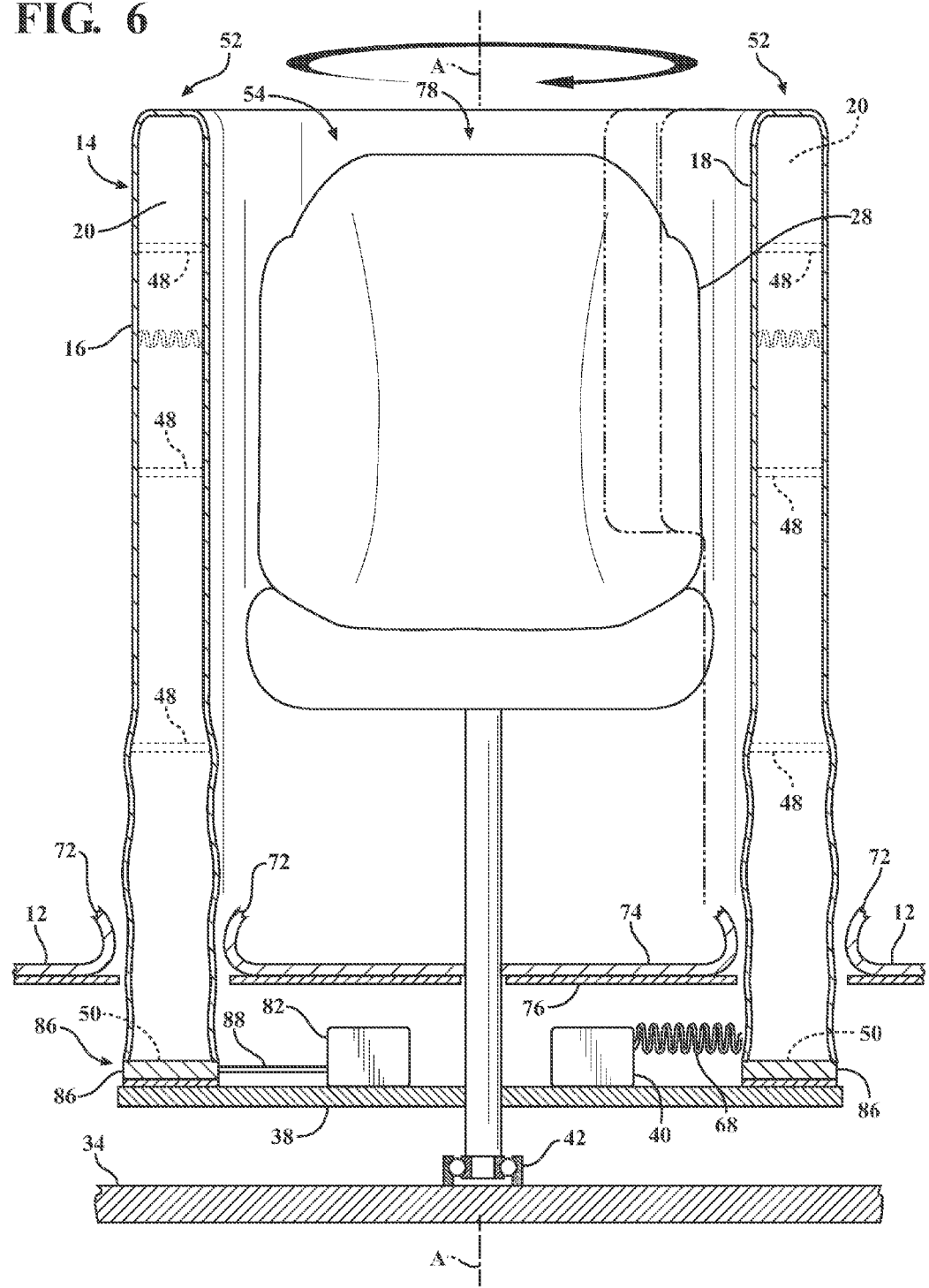
FIG. 6 is a cross-sectional view of the seat and the airbag in the inflated position.

As shown in FIG. 4 and FIG. 6, the base 38 may be rotatable relative to the floor 12. This may be constructed by connecting the base 38 to the cross-beam 34 using a bearing 42 or any other suitable rotating connection. Rotation of the seat 28 relative to the floor 12 may powered by the occupant 24 or an electric motor (not shown) or any other suitable way.

As set forth above, the vehicle interior 10 includes the airbag 14. Specifically, the vehicle interior 10 may include more than one airbag 14, as shown in the Figures. The airbags 14 may be fixed to the bases 38, respectively. Alternatively, the airbags 14 may be fixed to the floor panel 36 and/or to the cross-beams 34 of the floor 12. The airbags 14 may be disposed under the upholstery 74, e.g., between the base 38 and the upholstery 74.

The airbags 14 may be formed of any suitable type of material, e.g., from a woven polymer. For example, the airbag 14 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

As shown in Figures, the airbag 14 may be inflatable away from the base 38 to the inflated position. Specifically, in the inflated position, the outer panel 16, the inner panel 18, and the inflation chamber 20 extend along the curved path about the axis A, e.g., a vertical axis.

As shown in FIG. 2 and FIG. 6, the outer panel 16 and the inner panel 18 each may extend along the curved path from a first end 44 to a second end 46 spaced from the first end 44. The inner panel 18 and the outer panel 16 may be spaced from each other in the inflated position and may define the inflation chamber 20 there between. The inner panel 18 and the outer panel 16 may be concentric about the axis A. The inner panel 18 and the outer panel 16 may be connected by tethers 48 as shown in FIG. 6, or internal panels, etc.

With continued reference to FIG. 2 and FIG. 6, the airbag 14 in the inflated position may have a bottom 50 supported by the floor 12 and a top 52 adjacent the roof 32. The top 52 may contact the roof 32 in the inflated position or may be spaced from the roof 32 in the inflated position. The first end 44 and the second end 46 of the outer panel 16 and the inner panel 18 may extend from the bottom 50 to the top 52. In other words, the airbag 14 may include an opening 54 from the first end 44 to the second end 46 and from the bottom 50 to the top 52.

In one embodiment of the airbag 14, as shown in FIGS. 2 and 5-7, the opening 54 may be rectangular. Alternatively, in another embodiment of the airbag 14 shown in FIG. 8, the airbag 14, i.e., the outer panel 16 and the inner panel 18, may define a recess 56 extending from the first end 44 along the curved path at the bottom 50. In other words, the airbag 14, i.e., the outer panel 16 and the inner panel 18, may include a flap 58 spaced from the bottom 50 of the airbag 14 and extending toward the top 52 of the airbag 14. Specifically, as shown in FIG. 8, the flap 58 may extend to the top 52 of the airbag 14.

Figure 8:
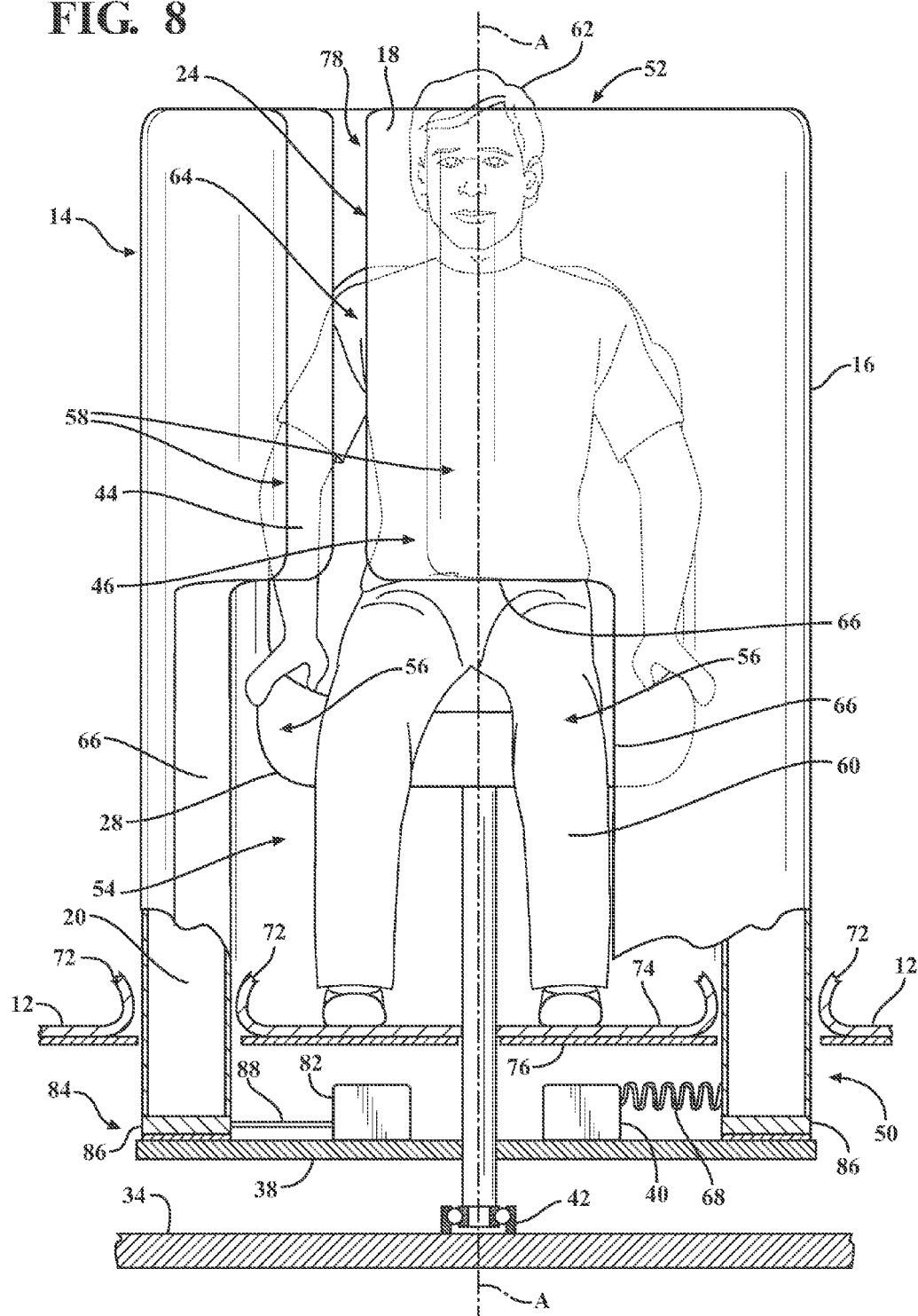
FIG. 8 is a cross-sectional view of the seat and another embodiment of the airbag in the inflated position.

In the embodiment of the airbag 14 shown in FIG. 8, the recess 56 may receive legs 60 of the occupant 24 during inflation of the airbag 14, as shown in FIG. 8 and described further below. The flap 58 of the airbag 14 may inflate in front of the head 62 and torso 64 of the occupant 24 to absorb energy from head 62 and torso 64 of the occupant 24 during the vehicle impact.

The recess 56 may have a rectangular shape or any other suitable shape. The flap 58 may have a rectangular shape or any other suitable shape. The airbag 14 may include special tethers (not shown) in the recess 56, in the flap 58, connected to boundaries 66 of the recess 56, and/or connected to the flap 58 to support and position the flap 58 during inflation. Alternatively or additionally, the flap 58 and the recess 56 may be supported during inflation in any suitable manner, e.g., stitching a material inside the airbag 14.

Figure 9:
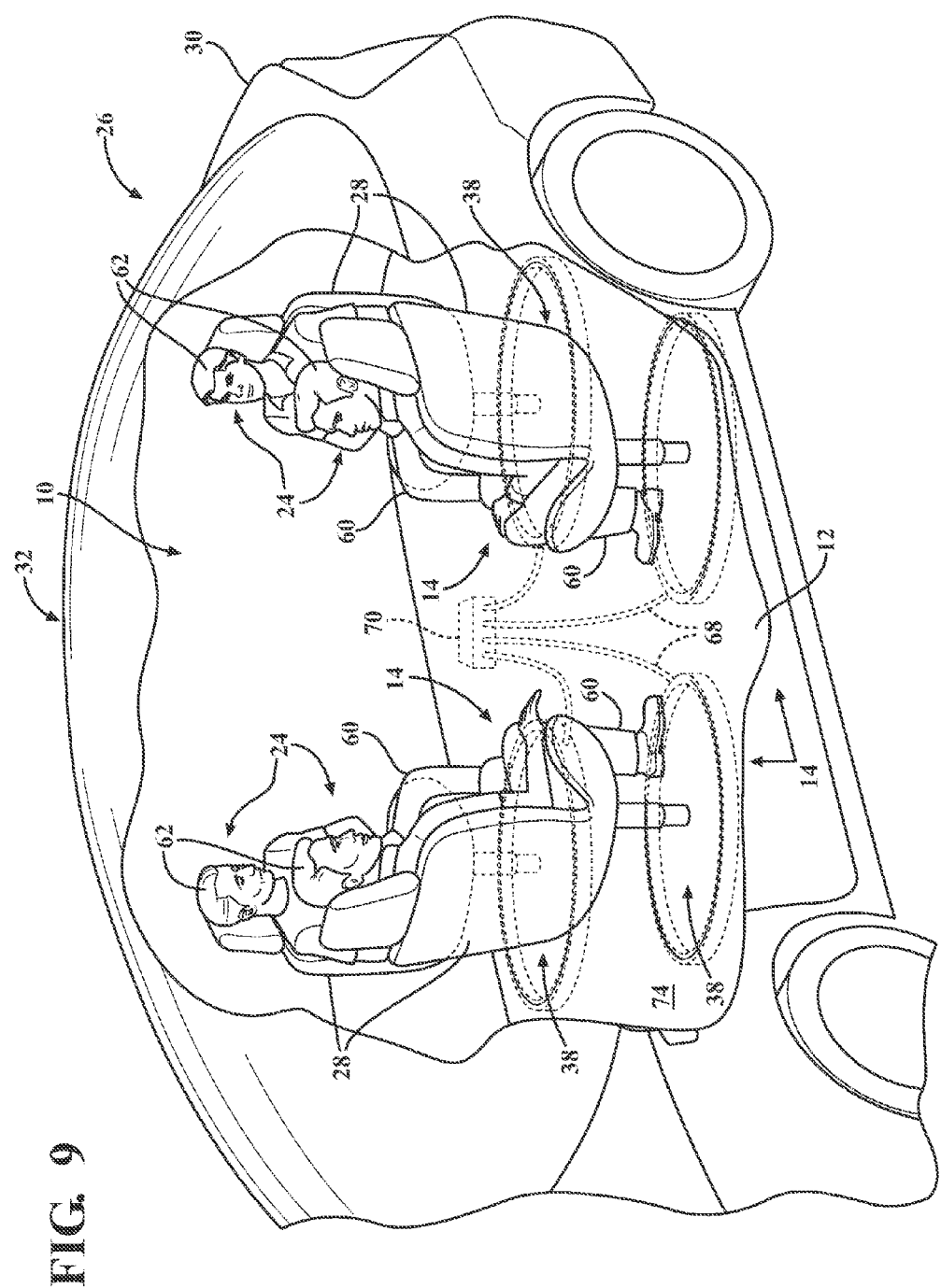
FIG. 9 is a perspective view of the vehicle with an inflator supported by the floor and connected to each airbag.

The vehicle interior 10 may include one or more inflators 40 that inflate the airbags 14 from the uninflated position to the inflated position. As one example, the vehicle interior 10 may include a plurality of inflators 40 in fluid communication with the airbags 14, respectively as shown in FIG. 1. In this instance, fill tubes 68 may connect the inflators 40 to the airbags 14, respectively. As another example, a single inflator 70 is connected to the airbags 14 as shown in FIG. 9. In this instance, fill tubes 68 may connect the single inflator 70 to the airbags 14. In this example, the fill tube 68 may be configured to enable the rotation of the seat 28, e.g., a rotational fitting (not numbered) for fluid communication may be used. The vehicle 26 may include any suitable number of inflators connected to any suitable number of airbags 14.

As shown in FIG. 4 and FIG. 6, the inflator 40 may be supported by the base 38 and the base 38 may rotate relative to the floor 12. When supported by the base 38, the inflator 40 moves with the base 38 and the seat 28, as the base 38 and the seat 28 rotate relative to the floor 12. In other words, the inflator 40 is fixed relative to the seat 28 when the seat 28 rotates. Alternatively, the single inflator 70 may be fixed to the floor 12 in fluid communication with all airbags 14, e.g., fixed to the cross-beams 34, as shown in FIG. 9. Alternatively, the single inflator 70 may be disposed at any other suitable part of the vehicle body 30, e.g. at the pillars.

The inflators 40, 70 expand the airbag 14 with an inflation medium, such as a gas, to move the airbag 14 from an uninflated position to the inflated position. Specifically, the inflators 40, 70 may be in communication with the inflation chamber 20 to supply the inflation medium to the inflation chamber 20. The inflators 40, 70 may be, for example, a pyrotechnic inflator that uses a chemical reaction to drive the inflation medium into the airbag 14. Alternatively, the inflator 40, 70 may be, for example, a cold-gas inflator that, when activated, ignites a pyrotechnic charge that creates an opening 54 for releasing the pressurized inflation medium to the airbags 14 via the fill tubes 68. Alternatively, the inflators 40, 70 may be of any suitable type, for example, a hybrid inflator.

The upholstery 74 may define a tear seam 72 aligned with the airbag 14. Upon inflation of the airbag 14, the airbag 14 may break the upholstery 74 at the tear seam 72 and protrude outwardly from the upholstery 74 to the inflated position. Additionally, the airbag 14 may be covered by a cover 76 disposed between the airbag 14 and the upholstery 74. The cover 76 may protect the airbag 14 in the uninflated position from wear and tear.

As shown in Figures, the curved path of the airbag 14 may extend at least partially around the respective seat 28, e.g., along one or more portions of a perimeter of the seat 28. Alternatively, the airbag 14 may surround the seat 28, i.e. around the entire perimeter of the seat 28. As shown in the Figures, the airbags 14 may extend around the seats 28, respectively, in the inflated position and in the uninflated position. In the inflated position, the airbags 14 may each define an occupant chamber 78 and the arced path may extend about the occupant chamber 78. In other words, the inner panel 18 and the outer panel 16 may extend the occupant chamber 78. The seat 28 may be disposed in the occupant chamber 78.

The curved path of the airbag 14 may have various shapes, e.g., as shown in Figures, the curved path may be an arc. Here the arc refers to a two-dimensional view of the airbag 14 crossed by a plane parallel to the floor 12. For example, the arc may be a segment of a circle, i.e., a circular arc.

Figure 3:
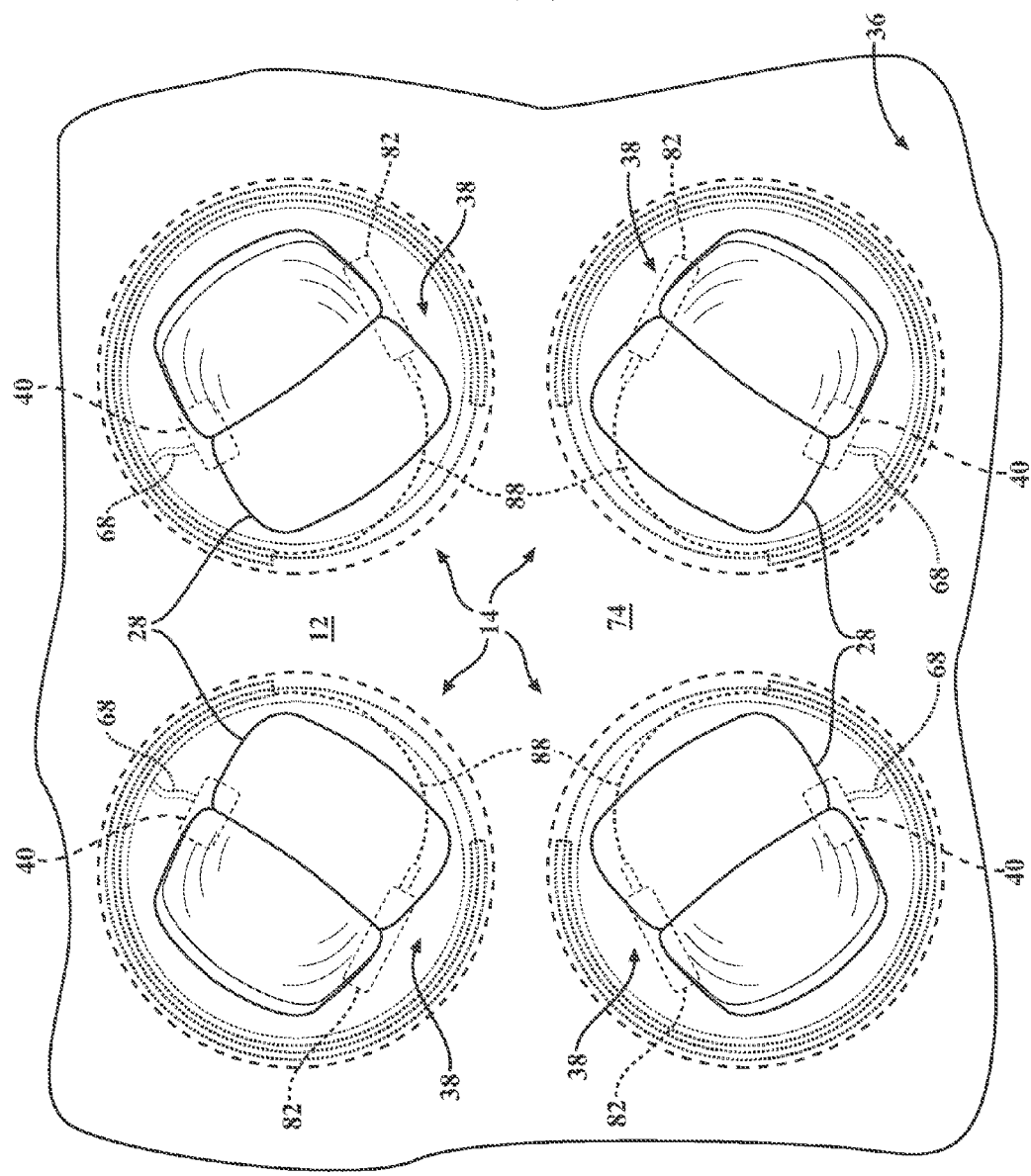
FIG. 3 is a top view of the vehicle.
Figure 7:
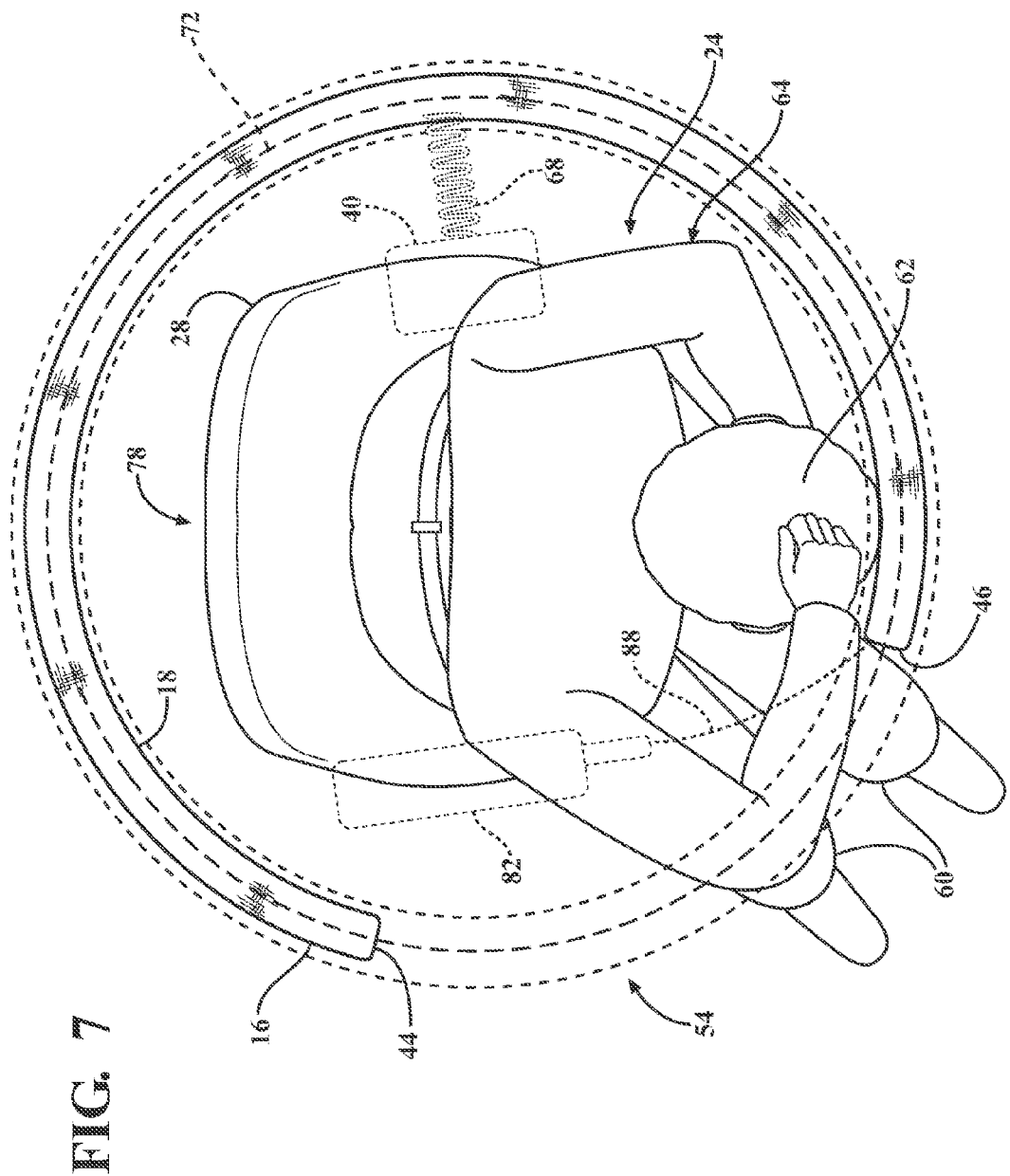
FIG. 7 is a top view of the seat and with the airbag inflated and moved relative to the floor and seat to a final position.

The vehicle interior 10 may include an actuator 82 supported by the base 38 and connected to the airbag 14. The actuator 82 may be actuated to move the airbag 14 relative to the seat 28 along the arc from an initial position (shown in FIGS. 1, 3, and 5) to a final position (shown in FIGS. 7 and 8). The actuator 82 may move the airbag 14 from the initial position to the final position during the inflation of the airbag 14. In the final position, the airbag 14 may be positioned in front of the head 62 and the torso 64 of the occupant 24, as shown in FIG. 7 and FIG. 8. This may reduce the likelihood of the occupants 24 impacting one another or the occupant 24 impacting other components of the vehicle interior 10. The actuator 82 may be constructed in various ways, e.g., a gas-fired tensioner or an electromagnetic actuator or any other suitable way.

In the embodiment of the airbag 14 shown in FIG. 7, the airbag 14 may contact the legs 60 of the occupant 24 while the actuator 82 moves the airbag 14 from the initial position to the final position. In this configuration, the airbag 14 may deform about the legs 60 and/or the airbag may move the legs 60 during inflation and movement from the initial position to the final position. In the embodiment of the airbag 14 shown in FIG. 8, the recess 56 may receive the legs 60 of the occupant 24 during inflation and movement from the initial position to the final position.

When the airbag 14 is moved to the final position, the fill tube 68 maintains the fluid communication, e.g., the fill tube 68 may be configured to enable the movement of the airbag 14, e.g., kinked or rolled when the airbag 14 is in uninflated position and may be long enough to reach the airbag 14 in the final position. The fill tube 68 may be formed of any suitable material, e.g., a flexible material and/or a shape-memory material.

The vehicle interior 10 may further include a guide 84 supported by the base 38, fixed relative to the seat 28, and extending at least partially around the seat 28, e.g., along one or more portions of a perimeter of the seat 28, and the airbag 14 is engaged with the guide 84. As shown in FIG. 4 and FIG. 6, the guide 84 may allow a movement of the airbag 14 to the final position.

As shown in FIG. 4 and FIG. 6, the vehicle interior 10 may further include a sliding member 86 connected to the actuator 82 and engaged with the guide 84, and the airbag 14 may be fixed to the sliding member 86. As an example, the sliding member 86 may be frictionally engaged with the guide 84. A frictional force of the guide 84 may initially inhibit the movement of the sliding member 86. The actuator 82 is configured to apply an actuator force greater than the frictional force. The actuator force may exceed the frictional force in an opposite direction of the actuator force and move the airbag 14 to the final position.

The vehicle interior 10 may further include a cord 88 extending from the actuator 82 to the airbag 14. The actuator 82 may release a pulling force. The pulling force is applied to the airbag 14 through the cord 88 and may move the airbag 14 to the final position.

As an example as shown in FIG. 4 and FIG. 6, the base 38 may rotate relative to the floor 12 and the guide 84 may be fixed to the base 38. The airbag 14 is engaged with the guide 84. Prior to an actuation of the actuator 82, the airbag 14 in the uninflated position may be engaged with the guide 84, which is fixed relative to the seat 28. After the actuation of the actuator 82, the airbag 14 may move relative to the seat 28 and the guide 84 to the final position.

As shown in FIG. 6, for example, the opening 54 is adapted to receive the legs 60 of the occupant 24 during the inflation. During initial inflation of the airbag 14 from the uninflated position to the inflated position the opening 54 receives the legs 60 of the occupant. The actuator 82 may be actuated before, during, or after the inflation of the airbag 14 is initiated. The movement of the airbag 14 toward the final position may be delayed to ensure that the legs 60 of the occupant 24 are received in the opening 54, in which case the airbag 14 may move the legs 60 of the occupant 24 to a side, as shown in FIG. 7. The delay between initiation of the inflation of the airbag 14 and the initiation of actuation of the actuator 82 be very short, e.g., less than 10 ms. Having a very short time delay may help to quickly place the airbag 14 at the final position to absorb energy from the occupant 24 during the vehicle impact. The airbags 14 in the final position may further reduce the likelihood of occupants 24 impacting one another or other components of the vehicle interior 10.

Figure 10:
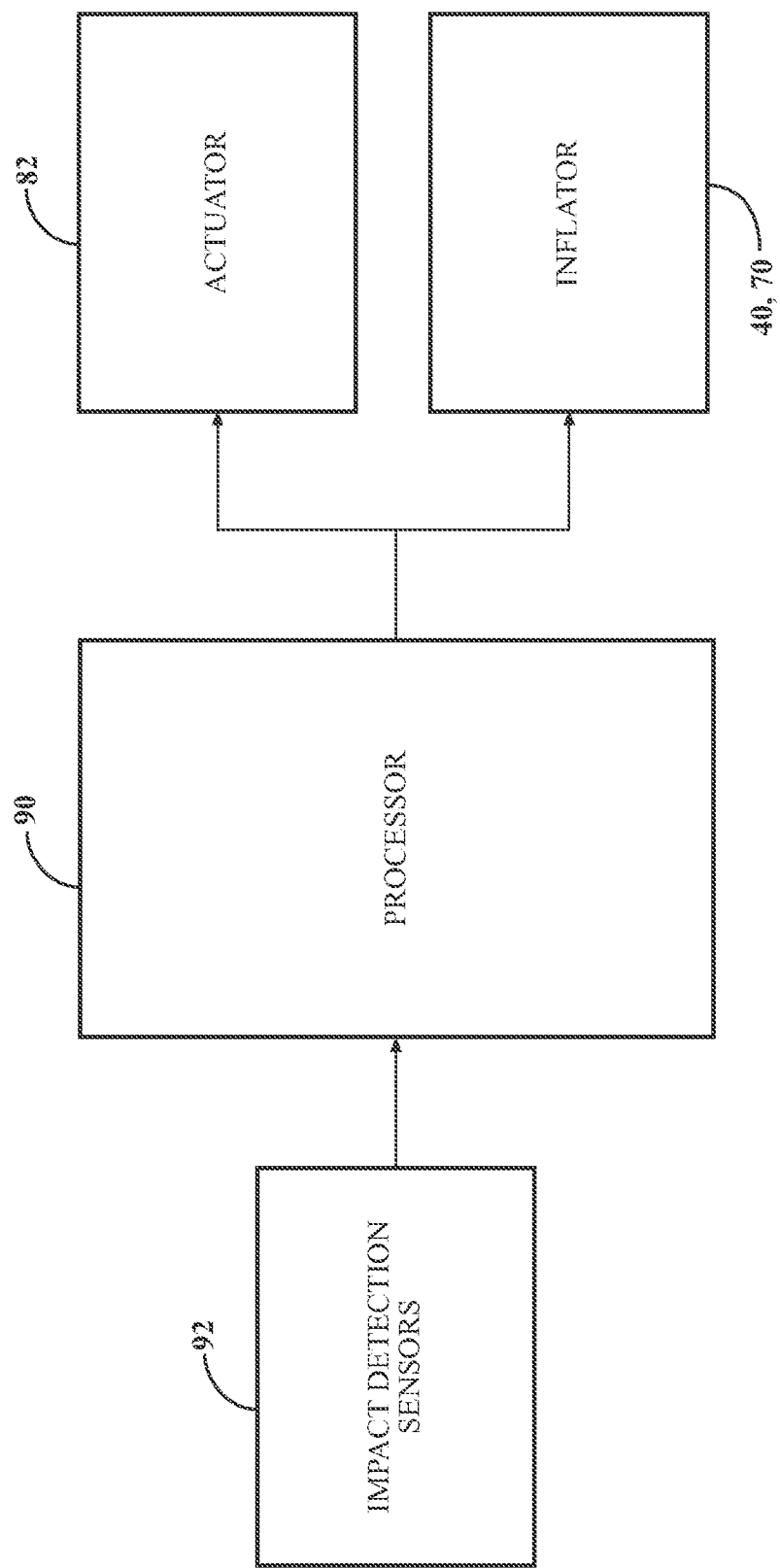
FIG. 10 is a flowchart including a processor, impact detection sensors, an inflator, and an actuator.

With reference to FIG. 10, the vehicle 26 may include a processor 90 programmed to initiate the inflation of the airbag 14 in response to detection of the vehicle impact by impact detection sensors 92. The processor 90 may be embedded in a microcontroller. The microcontroller may include memory, etc. The memory of the microcontroller may store instructions executable by the processor 90 and the processor 90 may read the instructions from the memory and execute the instructions.

Impact detection sensors 92 are adapted to detect the vehicle impact to the vehicle body 30. One or more impact detection sensors 92 may be disposed in the vehicle body or elsewhere in the vehicle 24. The impact detection sensors 92 may be of various types, e.g., pressure sensor, acceleration sensor, vision sensor, etc.

As shown in FIG. 10, when the vehicle impact occurs, the processor 90 may receive one or more signals from the impact detection sensors 92 indicating the vehicle impact. In response to receiving the signals from the impact detection sensors 92, the processor 90 may initiate the inflation of the airbag 20 by sending a signal to the inflator 40, 70. Furthermore, the processor 90 may send a signal to the actuator 82 to initiate the move of the airbag 14 to the final position.

The communication between the processor 90, the inflator 40, 70, the actuator 82, and the impact detection sensors 92 may be through direct wiring, wherein the signals are sent as analog or digital signals, or through a communication network like CAN (Control Area Network), Ethernet, LIN (Local Interconnect Network) or any other way.

Figure 11:
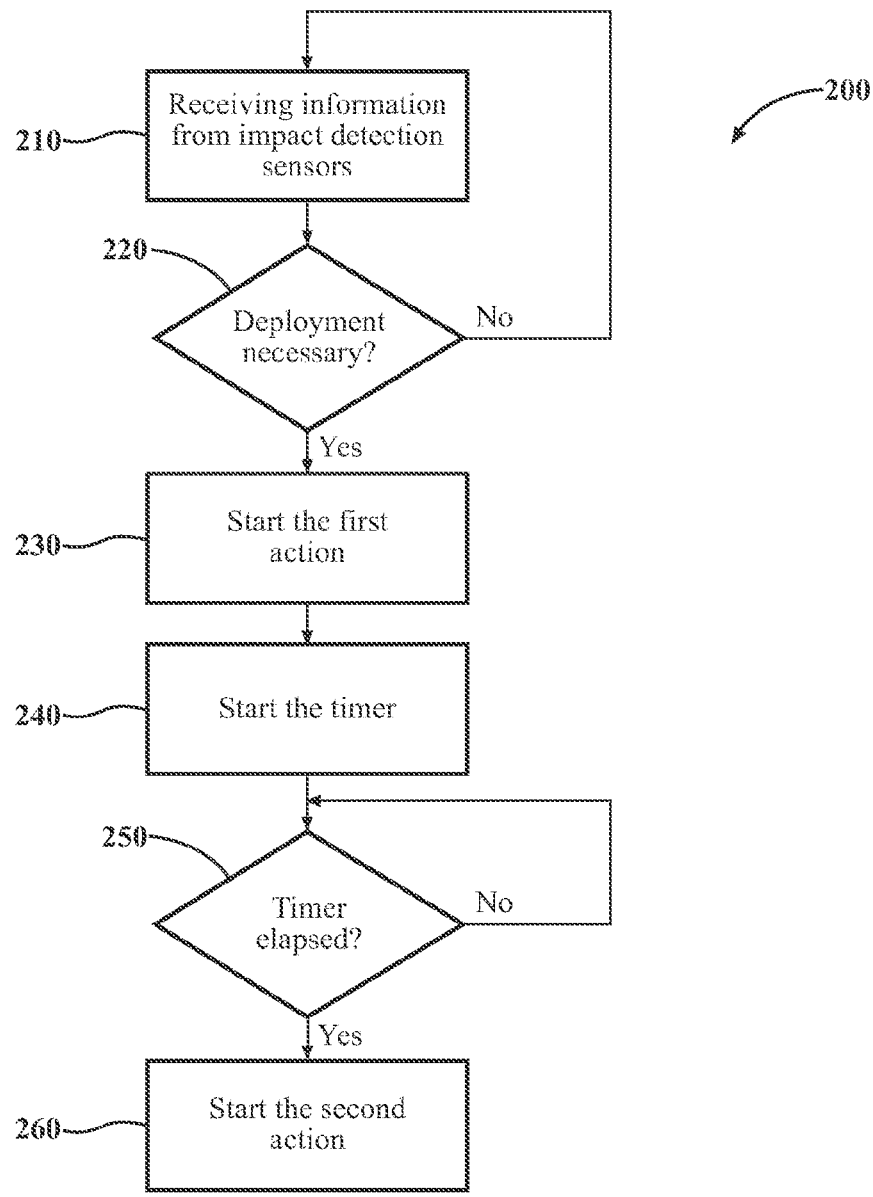
FIG. 11 is the flowchart of a process that may be executed by the processor.

FIG. 11 illustrates a flowchart of an example process 200 that may be executed by the processor 90. The processor 90 may be programmed to execute the process 200. The process 200 may receive impact information from the impact detection sensors 92 and may start the first action, i.e. the inflation of the airbag 14, and may start the second action, i.e. the actuating of the actuator 82 to move the airbag 14 to the final position.

With continued reference to FIG. 11, at block 210 the processor 90 may receive the impact information from the impact detection sensors 92. At block 220, the processor 90 may determine whether a deployment of the airbag 14 is necessary. An evaluation may be based on physical characteristics of the vehicle impact, or any other information from other vehicle controllers. In case the deployment is deemed necessary, at block 230 the processor 90 may start the first action by sending a signal to the inflators 40, 70 to inflate all of the airbags 14. Alternatively, the processor 90 may initiate a selective inflation of airbags 14, i.e. a specific subset of the airbags may be selected to be deployed. This may be determined based on which side of the vehicle 26 impacted, an amount and a direction of pressure applied to the vehicle body 30, whether the seat is occupied, etc. At block 240, the processor 90 may start a timer with a predetermined amount of time, e.g., 8 ms, to measure the time delay before actuating the actuator 82 to move the airbag 14 to the final position. At block 250, the processor 90 may determine whether the timer has elapsed, i.e. if the predetermined amount of time has passed since the start of the timer. In case the timer is deemed elapsed, at block 260, the processor 90 may initiate the second action by sending a signal to the actuator 82 to move all of the airbags 14 to the final position. In case the processor 90 has initiated the selective inflation of a specific subset of airbags in the first action, then the processor 90 may actuate the actuators 82 corresponding to the specific subset of airbags 14 to move the specific subset of airbags 14 to the final position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle interior comprising:
   a floor;
   a seat supported by the floor; and
   an airbag supported by the floor and being inflatable away from the floor to an inflated position, the airbag including an outer panel, an inner panel, and an inflation chamber defined between the inner panel and the outer panel;
   the outer panel and the inner panel extending along a curved path about an axis transverse to the floor in the inflated position, the curved path extending at least partially around the seat.

2. The vehicle interior according to claim 1, wherein the seat is rotatable relative to the floor.

3. The vehicle interior according to claim 1, wherein the outer panel and the inner panel each extend along the curved path from a first end to a second end spaced from the first end.

4. The vehicle interior according to claim 3, further comprising a roof, wherein the airbag in the inflated position has a bottom supported by the floor and a top adjacent the roof, the first end and the second end of the outer panel and the inner panel extending from the bottom to the top.

5. The vehicle interior according to claim 4, wherein the outer panel and the inner panel define a recess extending from the first end along the curved path at the bottom.

6. The vehicle interior according to claim 1, wherein the curved path is an arc.

7. The vehicle interior according to claim 1, further comprising a roof, wherein the airbag in the inflated position has a bottom supported by the floor and a top adjacent the roof.

8. The vehicle interior according to claim 1, wherein the inner panel and the outer panel are concentric about the axis.

9. The vehicle interior according to claim 1, further comprising upholstery supported by the floor and defining a tear seam aligned with the airbag.

10. A vehicle interior comprising:
    a base;
    a seat supported by the base;
    an airbag supported by the base, wherein the airbag is inflatable away from the base to an inflated position, the airbag including an outer panel, an inner panel, and an inflation chamber defined between the inner panel and the outer panel, the outer panel and the inner panel extending along a curved path about an axis transverse to the base in the inflated position;
    an inflator in fluid communication with the airbag; and
    an actuator supported by the base connected to the airbag.

11. The vehicle interior according to claim 10, further comprising a guide supported by the base and extending at least partially around the seat, wherein the airbag is engaged with the guide.

12. The vehicle interior according to claim 11, further comprising a sliding member connected to the actuator and engaged with the guide, the airbag being fixed to the sliding member.

13. The vehicle interior according to claim 10, further comprising a floor, the base being fixed relative to the floor.

14. The vehicle interior according to claim 10, further comprising a cord extending from the actuator to the airbag.

15. The vehicle interior according to claim 10, further comprising a floor, wherein the base is rotatable relative to the floor.

16. The vehicle interior according to claim 15, wherein the inflator is supported by the base.

17. The vehicle interior according to claim 15, wherein the inflator is supported by the floor.

18. The vehicle interior according to claim 15, further comprising a guide fixed to the base and extending at least partially around the seat, wherein the airbag is engaged with the guide.

19. A vehicle interior comprising:
    a floor; and
    an airbag supported by the floor and being inflatable away from the floor to an inflated position, the airbag including an outer panel, an inner panel, and an inflation chamber defined between the inner panel and the outer panel;
    the outer panel and the inner panel extending along a curved path about an axis transverse to the floor in the inflated position;
    wherein the outer panel and the inner panel each extend along the curved path from a first end to a second end spaced from the first end.

20. A vehicle interior comprising:
    a floor;
    an airbag supported by the floor and being inflatable away from the floor to an inflated position, the airbag including an outer panel, an inner panel, and an inflation chamber defined between the inner panel and the outer panel;
    the outer panel and the inner panel extending along a curved path about an axis transverse to the floor in the inflated position; and
    a roof, wherein the airbag in the inflated position has a bottom supported by the floor and a top adjacent the roof.

21. A vehicle interior comprising:
    a base;
    a seat supported by the base;
    an airbag supported by the base;
    an inflator in fluid communication with the airbag;
    an actuator supported by the base connected to the airbag; and
    a floor, wherein the base is rotatable relative to the floor.

* * * * *